(12) United States Patent
Geffard et al.

(10) Patent No.: US 9,162,358 B2
(45) Date of Patent: Oct. 20, 2015

(54) ROBOTIC DEVICE FOR ASSISTING HANDLING HAVING A VARIABLE FORCE INCREASE RATIO

(75) Inventors: Franck Geffard, Orsay (FR); Xavier Lamy, Issy-les-Moulineaux (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 141 days.

(21) Appl. No.: 13/807,871

(22) PCT Filed: Jun. 29, 2011

(86) PCT No.: PCT/EP2011/060928
§ 371 (c)(1),
(2), (4) Date: Dec. 31, 2012

(87) PCT Pub. No.: WO2012/001057
PCT Pub. Date: Jan. 5, 2012

(65) Prior Publication Data
US 2013/0110290 A1   May 2, 2013

(30) Foreign Application Priority Data
Jul. 2, 2010  (FR) ...................................... 10 55379

(51) Int. Cl.
*B25J 9/16*  (2006.01)
*B66C 23/00*  (2006.01)
*B66D 3/18*  (2006.01)

(52) U.S. Cl.
CPC .............. *B25J 9/1633* (2013.01); *B25J 9/1679* (2013.01); *B66C 23/005* (2013.01); *B66D 3/18* (2013.01); *G05B 2219/36429* (2013.01); *G05B 2219/39439* (2013.01); *Y10S 901/09* (2013.01); *Y10S 901/46* (2013.01)

(58) Field of Classification Search
USPC .......................... 700/258, 245, 260, 264, 261
See application file for complete search history.

(56) References Cited

U.S. PATENT DOCUMENTS

| | | | | |
|---|---|---|---|---|
| 4,367,532 | A * | 1/1983 | Crum et al. ................... | 700/260 |
| 4,589,810 | A * | 5/1986 | Heindl et al. ..................... | 414/5 |
| 4,740,126 | A * | 4/1988 | Richter ............................. | 414/4 |
| 5,865,426 | A | 2/1999 | Kazerooni | |
| 5,880,956 | A * | 3/1999 | Graf ................................ | 700/86 |
| 5,923,139 | A * | 7/1999 | Colgate et al. ................ | 318/566 |
| 6,204,620 | B1 | 3/2001 | McGee et al. | |

(Continued)

OTHER PUBLICATIONS

International Search Report of PCT/EP2011/060928 dated Oct. 6, 2011.

*Primary Examiner* — Nicholas Kiswanto
(74) *Attorney, Agent, or Firm* — Sughrue Mion, PLLC

(57) ABSTRACT

A robotic device for providing assistance in manipulation, including a base having a movable segment mounted thereon in association with a motor-drive mechanism connected to a control unit. The segment having an end portion provided with a member for holding an element to be manipulated and a handle for enabling the end portion to be manipulated by an operator. The control unit is connected to a detection mechanism for detecting an external force applied on the end portion and arranged to control the motor-drive mechanism as a function of an amplification factor for amplifying the detected force and servo-control gains. The control unit is connected to a pressure sensor mounted on the handle to detect the force with which the operator grips the handle and is arranged to modify the amplification factor and the servo-control gains as a function of the detected grip force.

8 Claims, 1 Drawing Sheet

(56) References Cited

U.S. PATENT DOCUMENTS

| | | | |
|---|---|---|---|
| 6,212,443 B1* | 4/2001 | Nagata et al. | 700/245 |
| 6,216,056 B1* | 4/2001 | Ito et al. | 700/157 |
| 6,385,508 B1* | 5/2002 | McGee et al. | 700/254 |
| 6,612,449 B1 | 9/2003 | Otani et al. | |
| 7,509,881 B2* | 3/2009 | Divigalpitiya et al. | 73/862.041 |
| 8,224,484 B2* | 7/2012 | Swarup et al. | 700/245 |
| 8,280,552 B2* | 10/2012 | Takesue et al. | 700/260 |
| 8,483,879 B2* | 7/2013 | Gao et al. | 700/258 |
| 8,606,403 B2* | 12/2013 | Rust et al. | 700/258 |
| 2009/0212478 A1* | 8/2009 | Murayama | 269/56 |
| 2009/0259412 A1* | 10/2009 | Brogardh | 702/41 |
| 2011/0118748 A1* | 5/2011 | Itkowitz | 606/130 |

* cited by examiner

ROBOTIC DEVICE FOR ASSISTING HANDLING HAVING A VARIABLE FORCE INCREASE RATIO

CROSS REFERENCE TO RELATED APPLICATIONS

This application is a National Stage of International Application No. PCT/EP2011/060928 filed Jun. 29, 2011, claiming priority based on French Patent Application No. 10 55379 filed Jul. 2, 2010, the contents of all of which are incorporated herein by reference in their entirety.

FIELD OF THE INVENTION

The present invention relates to a robotic device for assisting an operator in manipulating an element such as a tool or a heavy part.

BACKGROUND OF THE INVENTION

The invention has applications in particular in cobotics in which robots (or cobots) work in direct and intuitive collaboration with one or more operators with whom they share working space.

Progress in the field of robotics makes it possible to envisage having an element that is manipulated simultaneously by an operator and a robot (this may be referred to as co-manipulation or co-working) in such a manner as to associate the operator's intelligence and skill with the robot's strength and accuracy.

Robots are thus known that comprise a base having mounted thereon a movable segment associated with motor-drive means that are connected to a control unit. The movable segment has an end portion provided with a member for holding an element that is to be manipulated and a handle for enabling an operator to manipulate said end portion. The control unit is connected to force sensors fastened between said end portion and the operator's handle, and between said end portion and the element that is to be manipulated. The control unit is arranged to control the motor-drive means so as to amplify the force exerted by the operator by a predetermined factor.

The operator then guides the end portion of the movable segment and thus of the element that is attached thereto, while adapting to the constraints and hazards of the operation that is to be performed, leaving it to the robot to exert the force that needs to be applied to the element that is to be manipulated.

The development of those techniques comes up against the high level of inertia in robots, in particular industrial robots, that makes them relatively uncomfortable or even dangerous for an operator to use. This residual control inertia is due firstly to the inertia of the robot itself, and secondly to the lag introduced by the control system and the transmission of the force exerted on the element by the robot. The residual inertia prevents the operator from moving the movable segment easily. In addition, when the manipulated element is a blade, force amplification facilitates cutting operations, but also makes the blade even more dangerous, should the blade separate suddenly from the material it is cutting, since it is then moved with the predominant inertia of the robot multiplied by the force amplification gain.

In order to improve the performance of such robotic devices, the control unit is arranged to control the motor-drive devices in impedance as a function of data coming from sensors so as to compensate for friction internal to the structure of the device. Nevertheless, that does not make it possible to reduce significantly the inertia that is perceived by the operator. This limitation results mainly from the presence of a mechanical system between the motor-drive means and the force sensors, which mechanical system possesses modes of vibration that are not modeled at low frequency (at about ten hertz approximately). In addition, if the servo-control gains are increased in order to reduce the inertia perceivable by an operator, instabilities are generated by the motor-drive means when the operator takes a firm grip on the handle. Mechanical filters have been mounted in association with the sensors in order to damp said vibration, but such filters, made of flexible material, become flattened when forces increase and they then no longer perform their filtering function.

Attempts have also been made to remedy those drawbacks by using robots specially designed to limit inertia, e.g. by means of a lightweight structure. Nevertheless, such robots present drawbacks of being less rigid and less robust than industrial robots, while also being more expensive. Robots presenting low inertia and little friction are also generally of limited capacity in terms of producing force.

Various sensor arrangements have also been envisaged, but without achieving significant improvement.

OBJECT AND SUMMARY OF THE INVENTION

An object of the invention is to provide means for remedying the above-mentioned drawbacks, at least in part.

To this end, the invention provides a robotic device for providing assistance in manipulation, the device comprising a base having a movable segment mounted thereon in association with motor-drive means that are connected to a control unit, the segment having an end portion provided with a member for holding an element that is to be manipulated and a handle for enabling said end portion to be manipulated by an operator, the control unit being connected to determination means for determining the external force applied on said end portion and on the handle, and being arranged to control the motor-drive means as a function of a determined force amplification factor and of at least one determined servo-control gain. The control unit is connected to a pressure sensor mounted on the handle to detect the force with which the operator grips the handle and is arranged to modify the amplification factor and/or the servo-control gain as a function of the detected grip force.

Thus, the operator controls the force amplification factor of the robot in a manner that is intuitive. For example, when the element is a blade, the operator will intuitively hold the handle lightly while moving the movable segment through surroundings that are unconstrained in order to bring the blade up to the material for cutting, and will then grip the handle more strongly when the blade is to penetrate into the material for cutting. In the same manner, when the element that is to be manipulated is a heavy part that needs to be accurately positioned in a housing, the operator will intuitively grip the handle lightly during the approach stage and will then grip the handle more strongly during the final positioning stage. The amplification factor can thus be relatively small during the approach stage and relatively large during the final stage. Conversely, the servo-control gain may be high in empty space and low when making contact. Modifying the amplification factor and/or the servo-control gain serves to accelerate the response of the robotic device and to limit its inertia. As a result, the robotic device is less dangerous and is easier for the operator to manipulate. The robotic device of the invention may be made in a manner that is simple and inexpensive by adapting a conventional industrial robot.

BRIEF DESCRIPTION OF THE DRAWING

Other characteristics and advantages of the invention appear on reading the following description of a particular, non-limiting embodiment of the invention.

Reference is made to the accompanying drawing, in which.

MORE DETAILED DESCRIPTION

Figure 1:
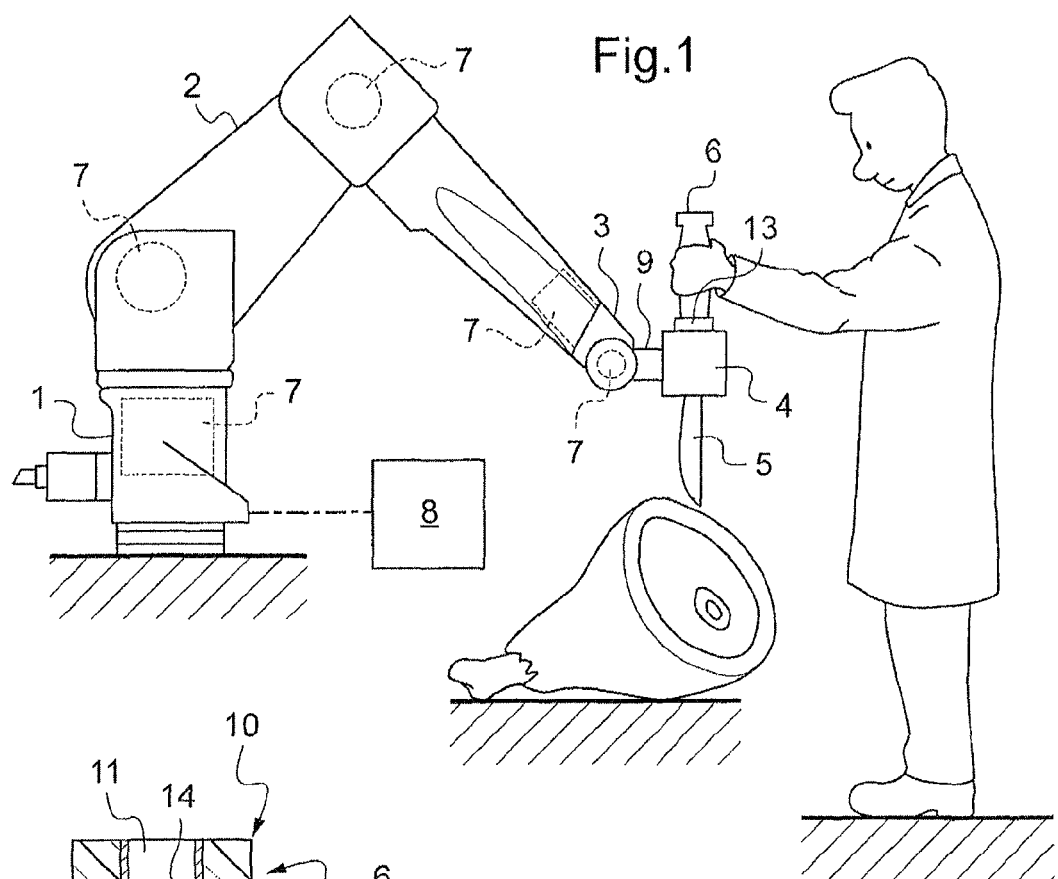
FIG. 1 is a diagrammatic view of a robotic device in accordance with the invention.
Figure 2:
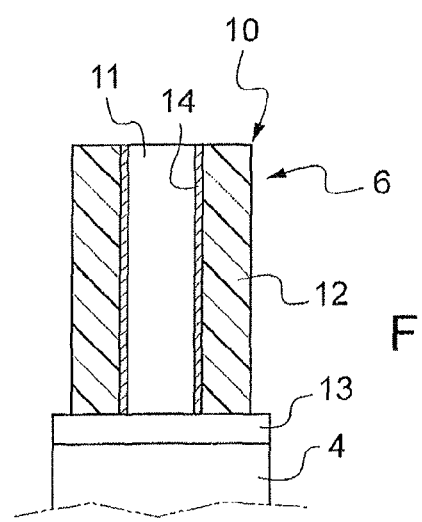
FIG. 2 is a fragmentary diagrammatic view of a handle fitted with pressure sensors.

The robotic device in accordance with the invention and shown in the figures is configured for a cutting application. Naturally, the invention is not limited to this application and can be used in other applications such as manipulating heavy parts in building work or for fabricating automobile or aviation vehicles, loading weapons with ammunition, . . . .

In this example, the robotic device comprises a base 1 on which a hinged arm 2 is mounted that has a free end 3 provided with a support 4 for a cutter element 5. A handle 6 is also mounted on the support 4.

Motor-drive means are mounted on the arms 2 in order to enable it to move. In this example, the motor-drive means are electric motors 7 that are arranged at the hinges of the arms 2 and that are connected to a control unit 8 arranged for controlling the motors 7. The motors 7 and the control unit 8 are themselves known.

The control unit 8 is also connected to a force sensor 9 for sensing the forces exerted by the tool on the arm 2, to a force sensor 13 for sensing the forces exerted on the arm 2 by the operator, and to a force sensor 10 for sensing the gripping force exerted by the operator on the handle 6.

The (optional) sensor 9 is of conventional type and comprises for example six strain gauges (for measuring all six components of the force torsor). The sensor 9 is mounted on the support 4 or on the free end 3 of the arm 2 in the vicinity of the connection between the support 4 and the arm 2.

A sensor 13, which may be identical to the sensor 9, is mounted between the support 4 and the handle 6 in order to measure the forces applied by the operator. A special assembly enables both of the sensors 9 and 13 to be placed in the support 4: one measuring the forces applied by the tool on the robot (or in equivalent manner by the robot on the tool, and thus on the surroundings), and the other measuring the forces applied by the operator on the robot.

The sensor 10 is incorporated in the handle 6. The handle 6 has a bar 11 rigidly fastened to the support 4 and covered in a flexible layer 12 of an elastically deformable material such as an elastomer. A pressure-detection film 14 extends between the flexible layer 12 and the bar 11, surrounding the bar. The pressure-detection film 14 comprises a plurality of electrodes associated in pairs and arranged to allow an electric signal to pass between the electrodes of a pair, which signal has a characteristic that depends on the force exerted on the flexible layer 12 overlying said pair. The flexible layer 12 also serves to damp any vibration that might pass via the handle between the robotic device and the operator.

Figure 3:
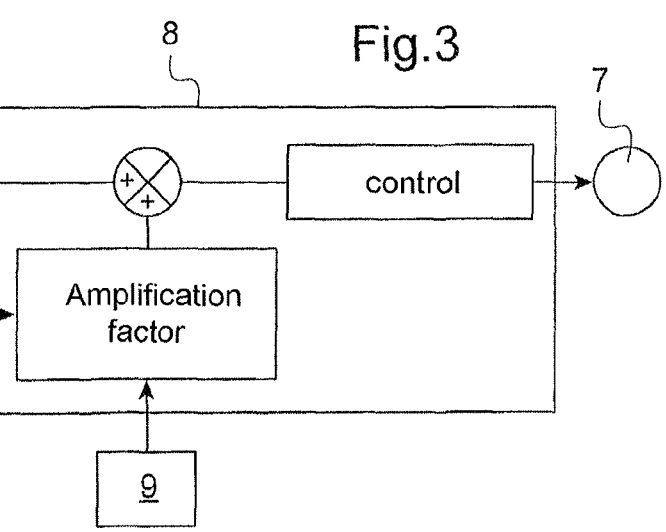
FIG. 3 is a block diagram showing the principle of the control system of the robotic device.

With reference more particularly to FIG. 3, the control unit 8 is arranged to control the motors 7 so as to amplify the force detected by the sensor 13 by a predetermined factor, while modifying that amplification factor as a function of the gripping force detected by the sensor 10, and to do so in such a manner as to improve the reversibility of the robot by modifying the servo-control gains as a function of the gripping force. The sensor 9 serves to measure the force actually exerted by the robot on the tool and to verify whether the axially-exerted force corresponds to the calculated amplified force.

Thus, the amplification factor and the servo-control gains depend on the gripping forces exerted by the operator on the handle 6. The relationships between firstly the amplification factor and the servo-control gains, and secondly the gripping force exerted by the operator on the handle 6 may optionally be linear, possibly varying continuously or stepwise, and they may be proportionality relationships or they may have only two values for the amplification factor and the servo-control gain, these values corresponding respectively to a light grip on the handle and to a strong grip.

Specifically, the amplification factor is equal to one (minimum value), when the operator holds the handle 6 practically without gripping it, and it increases up to a maximum value when the operator grips the handle 6 firmly. Similarly, as a function of operating stages, the servo-control gains vary between two extreme values, both presenting stability that has been validated.

Naturally, the invention is not limited to the embodiment described but covers any variant coming within the ambit of the invention as defined by the claims.

In particular, the forces exerted on the robotic arm may be measured in various ways, e.g. by using dedicated hinge sensors and/or by measuring the current delivered to the hinge motors while making use of models giving a relationship between a position of the arm and a force on the associated tool, . . . . The device may also have a sensor dedicated to detecting the forces exerted by the operator on the arm 2. Detection must make it possible to measure and distinguish between the force exerted by the user on the arm and the force exerted by the arm on its surroundings.

The term "determination" is used to cover detecting, measuring, or estimating the force applied by the operator.

Any type of pressure sensor can be used for implementing the invention. The pressure sensor may thus be of the piezoelectric type, the piezoresistive type, or of the capacitive type.

The robotic device may be a robot having six or more degrees of freedom, or it may have a structure that is simpler, with only a limited number of hinges.

The servo-control gain may possess values that correspond respectively to a light grip on the handle and to a strong grip, or else the servo-control gain may vary between a minimum value and a maximum value as a function of the grip pressure on the handle.

The invention claimed is:

1. A robotic device for providing assistance in manipulation, the device comprising a base having a movable segment mounted thereon in association with a motor-drive connected to a control unit, the segment having an end portion provided with a member for holding an element that is to be manipulated and a handle mounted on a support attached to said end portion for enabling said end portion to be manipulated by an operator, wherein the control unit is connected to a first force sensor associated to the support for sensing force applied by the operator on said end portion and is arranged to control the motor-drive so as to amplify the force detected by said first force sensor as a function of a determined force amplification factor and of at least one determined servo-control gain; the control unit is connected to a pressure sensor mounted on the handle to detect the force with which the operator grips the handle and is arranged to modify at least one of the amplification factor or the servo-control gain as a function of the detected grip force and wherein the control unit is connected to a second force sensor for sensing the force exerted by the element on said end portion and is arranged to verify whether said force exerted by the element on said end portion corresponds to the amplified force.

2. A device according to claim 1, wherein the handle comprises a rod covered in a layer of elastically deformable material, and a pressure-detection film having electrodes and extending between the rod and the deformable material for allowing an electric signal to pass between the electrodes, which signal has a characteristic that depends on the thickness of the deformable layer overlying the electrodes.

3. A device according to claim 1, wherein the amplification factor possesses two values corresponding respectively to a light grip on the handle and to a strong grip.

4. A device according to claim 1, wherein the amplification factor varies between a minimum value and a maximum value as a function of the grip pressure on the handle.

5. A device according to claim 1, wherein the servo-control gain possesses values that correspond respectively to a light grip on the handle and to a strong grip.

6. A device according to claim 1, wherein the servo-control gain varies between a minimum value and a maximum value as a function of the grip pressure on the handle.

7. The device according to claim 1, wherein the first force sensor is physically attached to the support.

8. The device according to claim 7, wherein the first force sensor is located between the handle and the support.

* * * * *